United States Patent [19]

Gardner

[11] Patent Number: 5,527,632
[45] Date of Patent: Jun. 18, 1996

[54] HYDROCARBON FUELLED FUEL CELL POWER SYSTEM

[75] Inventor: Frederick J. Gardner, Derby, England

[73] Assignee: Rolls-Royce and Associates Limited, Derby, United Kingdom

[21] Appl. No.: 435,329

[22] Filed: May 5, 1995

Related U.S. Application Data

[63] Continuation of Ser. No. 378,290, Jan. 26, 1995, abandoned.

[30] Foreign Application Priority Data

Jul. 1, 1993 [GB] United Kingdom ............... 9213956

[51] Int. Cl.$^6$ ........................................... H01M 8/02
[52] U.S. Cl. .................. 429/27; 429/17; 429/19; 429/20; 429/21; 429/23; 429/25
[58] Field of Search ................. 429/17, 19, 20, 429/21, 23, 25

[56] References Cited

U.S. PATENT DOCUMENTS

| | | | |
|---|---|---|---|
| 4,349,613 | 9/1982 | Winsel | 429/17 |
| 4,659,634 | 4/1987 | Struthers | 429/19 |
| 4,904,548 | 2/1990 | Tajima | 429/22 |
| 5,229,222 | 7/1993 | Tsutumi et al. | 429/19 |

FOREIGN PATENT DOCUMENTS

| | | |
|---|---|---|
| 57-145276 | 9/1982 | Japan . |
| 5714276 | 9/1982 | Japan . |
| 4163860 | 6/1992 | Japan . |
| 4338101 | 11/1992 | Japan . |
| 1037423 | 5/1963 | United Kingdom . |
| 1037423 | 5/1963 | United Kingdom . |

*Primary Examiner*—M. Nuzzolillo
*Attorney, Agent, or Firm*—Cushman Darby & Cushman

[57] ABSTRACT

A hydrocarbon fuelled fuel cell power system comprises a fuel cell stack, a reformer and a hydrogen store. The reformer is arranged periodically to supply reformate, which contains hydrogen, to the fuel cell stack and to the hydrogen store. The hydrogen store is arranged to store the hydrogen from the reformate during the periods that the reformer operates. The hydrogen store is arranged to supply hydrogen to the fuel cell stack during periods of low load demands on the fuel cell stack and is capable of supplying hydrogen rapidly to the fuel cell stack for high load demands on the fuel cell stack. The hydrogen store also supplies hydrogen to the reformer to light up the reformer. The hydrogen store buffers the fast response of the fuel cell stack and the relatively slower response of the reformer during relatively large rapid demands on the fuel cell stack and enables the reformer to be operated in an on/off mode.

22 Claims, 2 Drawing Sheets

HYDROCARBON FUELLED FUEL CELL POWER SYSTEM

This is a continuation of application Ser. No. 08/37,290 filed on Jan. 26, 1995, which was abandoned upon the filing hereof and which is a continuation of Ser. No. 08/083,690 filed Jun. 30, 1993, now abandoned.

FIELD OF THE INVENTION

The present invention relates to hydrocarbon fuelled fuel cell power systems.

BACKGROUND OF THE INVENTION

In hydrocarbon fuelled fuel cell power systems a reformer is used to reform a hydrocarbon fuel, such as natural gas, methanol, etc, into a hydrogen rich reformate gas which is supplied to the anode chambers of the fuel cell stack. The fuel cell stack may comprise a plurality of phosphoric acid fuel cells or a plurality of solid membrane electrode assembly fuel cells, for example solid polymer fuel cells.

The characteristics of a fuel cell make it intrinsically more efficient at low power than at high power, making the fuel cell well suited, in principle, to low load factor applications. Low load factor applications often require rapid load following response characteristics. Typical low load factor applications include the electric load demand of a residential dwelling, a motor vehicle, etc. Any power system designed to service such applications would spend long periods of time at zero load, but yet be required to start up virtually instantaneously on demand. In principle the low temperature, robust solid polymer fuel cell can respond instantaneously to changes in load demand, making it well suited to such applications.

However, to sustain an increased load demand in practice requires a similar instantaneous response from the reformer. Currently used reformers, for example steam reformers or autothermal reformers, have relatively slow response times and relatively long start up times. A recent reformer concept, which is described in European Patents 0217532 and 0262947, has a faster response time and a shorter start up time than the currently used reformers. Unfortunately the response and start up times of this reformer are still slower than the response time of a fuel cell, such as the solid polymer fuel cell, and are also slower than the response time required in residential, automotive and many other applications.

The electric current drawn from the fuel cell stack will respond instantaneously to a load demand, but as mentioned above the hydrogen supply from the reformer takes a little longer to respond. The transport delay as the hydrogen flows along the pipes is also likely to be significant because of the low flow rates. The reformate in the anode chambers of the fuel cell stack provides some spare capacity, but this is not sufficient to supply the large load changes the fuel cell stack is designed to meet. Thus the hydrogen partial pressure in the anode chambers of the fuel cell stack will fall rapidly, during large power demands, with a consequential fall in output voltage.

SUMMARY OF THE INVENTION

Accordingly the present invention seeks to provide a hydrocarbon fuelled fuel cell power system in which the aforementioned problems are reduced, or overcome.

Accordingly the present invention provides a hydrocarbon fuelled fuel cell power system comprising a fuel cell stack having a plurality of anode chambers and a plurality of cathode chambers, a reformer arranged to produce hydrogen from a hydrocarbon fuel and to supply hydrogen to the anode chambers of the fuel cell stack, the reformer is arranged to supply hydrogen to a hydrogen store, the hydrogen store is arranged to store hydrogen and to supply stored hydrogen to the anode chambers of the fuel cell stack to buffer the fast response of the fuel cell stack and the relatively slower response of the reformer during relatively large rapid load demands on the fuel cell stack.

Preferably the hydrogen store comprises a metal hydride. The metal hydride may be an iron-titanium alloy, a mischmetal-nickel-iron-titanium alloy or any other suitable alloy. The hydrogen store may be a pressure vessel for storing compressed hydrogen.

Preferably a hydrogen pump interfaces between the hydrogen store and the reformer to supply hydrogen into the hydrogen store. Preferably the hydrogen pump comprises an electrochemical pump. Preferably the hydrogen pump comprises a proton exchange membrane interface between the hydrogen store and the hydrogen produced by the reformer, the proton exchange membrane has electrodes mounted on opposite surfaces, the electrodes are connected to an electrical source, and the electrical potential of the electrical source controls the flow of hydrogen through the proton exchange membrane.

Preferably the metal hydride hydrogen store has a heater to desorb hydrogen. The heater may be an electrical heater connected to an electrical source.

Preferably the reformer and the hydrogen store are arranged to supply hydrogen to the anode chambers of the fuel cell stack by a common supply pipe. Preferably the hydrogen store is arranged to supply hydrogen to the anode chambers of the fuel cell stack by a second supply pipe. The second supply pipe may have a first control valve to control the flow of hydrogen from the hydrogen store to the fuel cell stack.

Preferably the hydrogen store is arranged to supply hydrogen to the reformer by a third supply pipe such that the hydrogen is burnt to produce energy to preheat the reformer to a temperature sufficient for reforming the hydrocarbon to hydrogen. The third supply pipe may have a second control valve to control the supply of hydrogen to the reformer.

Preferably a control means is arranged to control the operation of the first valve, the second valve, the hydrogen pump and the heater. Preferably voltage sensor means are provided to measure the voltage produced across the fuel cell stack, the means supplying a voltage signal to the control means, the control means analysing the voltage across the fuel cell stack and controlling the operation of the first valve, the second valve, the hydrogen pump and/or the heater. Preferably current sensor means are provided to measure the current produced by the fuel cell stack, the current sensor means supplying a current signal to the control means, the control means analysing the current produced by the fuel cell stack and controlling the operation of the first valve, the second valve, the hydrogen pump and/or the heater. Preferably pressure sensor means are provided to measure the partial pressure of hydrogen in the reformate supplied to the anode chambers of the fuel cell stack, the pressure sensor means supplying a partial pressure signal to the control means, the control means analysing the partial pressure of hydrogen in the reformate supplied to the fuel cell stack and controlling the operation of the first valve, the second valve, the hydrogen pump and/or the heater.

The present invention also provides a method of operating a hydrocarbon fuelled fuel cell power system comprising a fuel cell stack having a plurality of anode chambers and a plurality of cathode chambers, a reformer being arranged to produce hydrogen from a hydrocarbon fuel, and a hydrogen store, the method comprising periodically supplying stored hydrogen from the hydrogen store to the reformer, burning the hydrogen in the reformer to raise the temperature in the reformer to a temperature sufficient for reforming the hydrocarbon fuel, supplying hydrocarbon fuel to the reformer and reforming the hydrocarbon fuel into hydrogen whilst terminating the supply of hydrogen from the hydrogen store to the reformer, supplying hydrogen from the reformer to the anode chambers of the fuel cell stack and to the hydrogen store, storing some of the hydrogen supplied by the reformer in the hydrogen store to recharge the hydrogen store with hydrogen, terminating the supply of hydrocarbon fuel to the reformer after a predetermined time period, supplying hydrogen from the hydrogen store to the anode chambers of the fuel cell stack at a relatively low flow rate during low electrical load demand on the fuel cell stack or supplying hydrogen from the hydrogen store to the anode chambers of the fuel cell stack at a higher flow rate during high electrical load demand on the fuel cell stack to buffer the fast response of the fuel cell stack and the relatively slower response of the reformer during relatively large rapid electrical load demands on the fuel cell stack.

The present invention will be more fully described by way of example with reference to the accompanying drawings, in which:

DETAILED DESCRIPTION OF THE INVENTION

Figure 1:
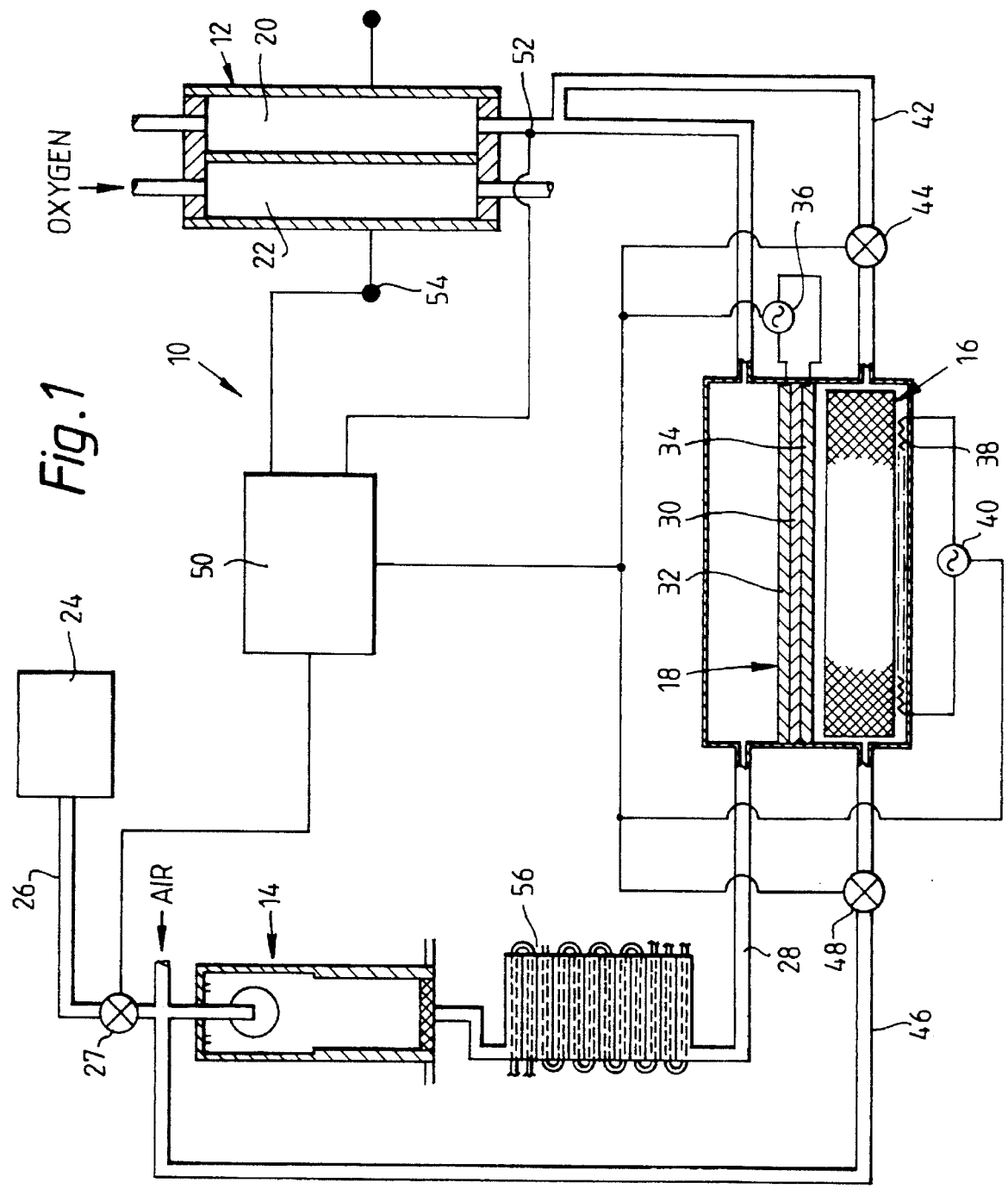
FIG. 1 is a schematic diagram of hydrocarbon fuelled fuel cell power system according to the present invention.
Figure 2:
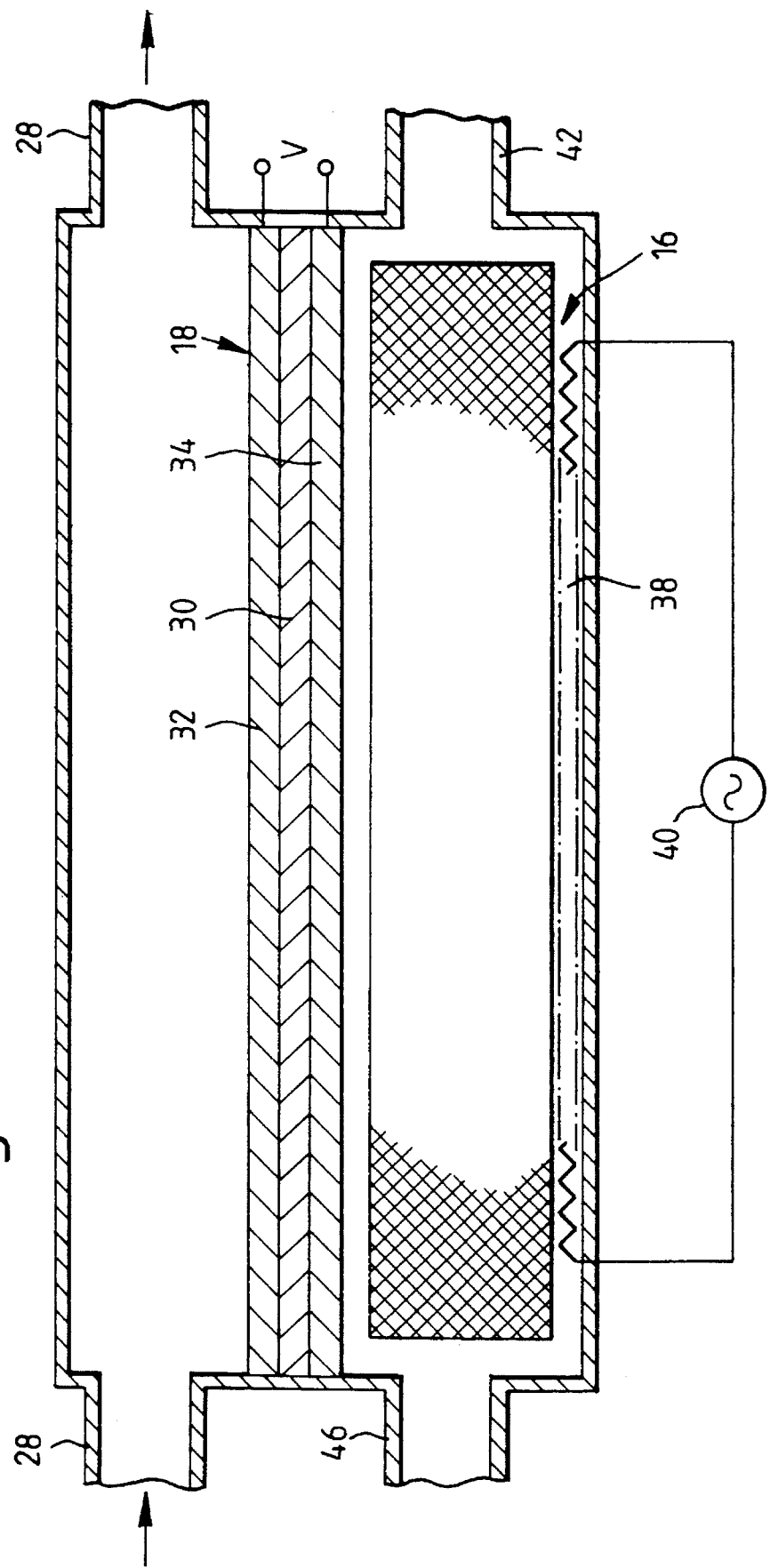
FIG. 2 is an enlarged schematic diagram of a hydrogen store and a hydrogen pump shown in FIG. 1.

A hydrocarbon fuelled fuel cell power system 10, as shown in FIG. 1, comprises a fuel cell stack 12, a reformer 14, a hydrogen store 16 and a hydrogen pump 18.

The fuel cell stack 12 comprises a plurality of fuel cells which have anode chambers 20 and cathode chambers 22. Only one fuel cell with its associated anode chamber 20 and cathode chamber 22 is shown for clarity. The fuel cell stack 12 comprises a plurality of solid polymer fuel cells, although other suitable fuel cells may be used.

The reformer 14 is arranged to be supplied with a hydrocarbon fuel from a source of hydrocarbon fuel 24 a pipe 26. The reformer 14 is arranged to reform the hydrocarbon fuel into reformate gases which include hydrogen and carbon dioxide, although some carbon monoxide is produced. The reformer 14 may be a steam reformer, an autothermal reformer, a partial oxidation reformer or any other suitable reformer. The reformer 14 is arranged to supply the reformate gases to the anode chambers 20 of the fuel cell stack 12 a supply pipe 28.

The hydrogen pump 18 interfaces between the hydrogen store 16 and the supply pipe 28 at any suitable position between the reformer 14 and the fuel cell stack 12. The hydrogen store 16 is maintained charged with hydrogen by the hydrogen pump 18.

The hydrogen store 16 is a metal hydride hydrogen store in which hydrogen is stored under a relatively high pressure, compared with the hydrogen partial pressure in the reformate gases produced by the reformer 14. The metal hydride hydrogen store may be an iron-titanium alloy, a mischmetal-nickel-iron alloy or any other suitable alloy. Alternatively the hydrogen store may comprise a pressure vessel arranged to hold compressed hydrogen.

The hydrogen pump 18 is an electrochemical hydrogen pump and comprises a proton exchange membrane 30 which has electrodes 32 and 34 arranged on opposite surfaces thereof, that is on the surfaces of the proton exchange membrane 30 which interface with a pure hydrogen atmosphere in the hydrogen store 16 and the reformate atmosphere in the supply pipe 28. The electrodes 32 and 34 are connected to an electrical source 36. The electrodes 32 and 34 facilitate the oxidation of hydrogen atoms, on one side of the proton exchange membrane 30, and the reduction of hydrogen ions passing through the proton exchange membrane 30 on the other side of the proton exchange membrane 30. The potential of the electrical source 36 determines the rate and direction of the pumping of the hydrogen through the proton exchange membrane 30. The potential of the electrical source 36 is set to pump hydrogen from the reformate gases in the pipe 28 to the hydrogen store 16. The equilibrium pressure ratio across the pump is given by:

$$P_H \text{ (hydride)}/P_H \text{ (reformate)} = \exp[2FV/(RT)]$$

Where:

$P_H$ (hydride) = hydrogen partial pressure over the hydride $P_H$ (reformate) = hydrogen partial pressure in the reformate F = Faraday's constant (96,487 Coulombs/mole of electrons)

R = Universal gas constant (8.3143 J/gmol K)

T = absolute temperature

V = voltage applied to the pump

Thus the equilibrium pressure ratio is set by the choice of the voltage V. Thus during normal loaded operation of the fuel cell power system the hydrogen store 16 is maintained in a charged condition automatically. When the pressure ratio is lower than this equilibrium ratio hydrogen is pumped through the proton exchange membrane 30 from the reformate in the pipe 28 to the hydrogen store 16. The resulting increase in pressure over the metal hydride in the hydrogen store 16 causes the metal hydride to absorb hydrogen. This reaction is exothermic and the temperature of the hydrogen store 16 rises, causing heat to be dissipated to the surroundings.

As the pressure ratio rises the amount of hydrogen pumped from the reformate gases in pipe 28 to the hydrogen store 16 diminishes, eventually to zero when the pressure ratio reaches equilibrium. The hydrogen store 16 is then fully charged.

If the pressure ratio across the hydrogen pump 18 is greater than that given by the above expression, for the prevailing applied voltage, hydrogen flows through the proton exchange membrane 30 from the hydrogen store 16 to the pipe 28. The resulting fall in pressure over the metal hydride in the hydrogen store 16 causes the metal hydride to release absorbed hydrogen. This reaction is endothermic and the temperature of the hydrogen store 16 falls, causing heat to be absorbed from the surroundings. To ensure hydrogen is released at the required rate, a small electrical heater 38 is embedded in the metal hydride to provide the endothermic heat required to desorb the hydrogen. The electrical heater 38 is connected to an electrical source 40.

The hydrogen store 16 is also directly connected to the anode chambers 20 of the fuel cell stack 12 by a second supply pipe 42, which has a first control valve 44 to control the flow of hydrogen from the hydrogen store 16 to the anode chambers 20 of the fuel cell stack 12.

The hydrogen store 16 is also directly connected to the reformer 14 by a third supply pipe 46, which has a second control valve 48 to control the supply of hydrogen from the hydrogen store 16 to the reformer 14.

A controller 50, which may be a microprocessor or a computer, is electrically connected to the control valves 44 and 48 and is electrically connected to the electrical supplies 36 and 40 for the hydrogen pump 18 and the electrical heater 40 to control the operation of these devices. The controller 50 is arranged to be supplied with electrical signals from a pressure sensor 52, which measures the partial pressure of hydrogen in the reformate gases supplied to the anode chambers 20 of the fuel cell stack 12. The controller 50 is arranged to be supplied with electrical signals from a voltage/current sensor 54 which measures the voltage and/or current generated by the fuel cell stack 12.

A reformate conditioner 56 is positioned in the pipe 28 downstream of the reformer 14 and upstream of the hydrogen store 16 and hydrogen pump 18. The reformate gases leave the reformer 14 at a temperature of 200° C., or more, and contain between 0.5% and 2% of carbon monoxide. The reformate conditioner 56 is arranged to oxidise the residual carbon monoxide to carbon dioxide to leave trace levels as required by the fuel cell stack. The carbon monoxide poisons the anode catalysts and this leads to severe deterioration in the fuel cell stack output voltage, and an increase in the amount of waste heat generated by the fuel cell stack. The reformate conditioner 56 also humidifies and cools the reformate gases to a temperature of around 80° and 100° C. or preferably less than 120° C. The temperature of the reformate gases must be less than 120° C. to avoid damage to the solid polymer membrane/proton exchange membrane in the fuel cell stack 12.

Reforming natural gas requires that high temperatures prevail in the reforming zones of the reformer 14. To start the reformer 14 from cold conditions requires a suitable light-off agent, hydrogen is a suitable light-off agent. The hydrocarbon fuelled fuel cell power system 10 has a pipe 46, which is arranged to supply hydrogen directly from the hydrogen store 16 to the reformer 14 when the valve 48 is opened at light-off conditions. This arrangement is particularly suitable for use with the Hot Spot Reformer (Registered Trade Mark) described in European Patents 0217532 and 0262947, which are incorporated herein by reference, by supplying the hydrogen to the pipe, which supplies fuel to the hot spot in the reformer, at start up. Air is also supplied to the hot spot the same pipe. Once the hydrogen/air reaction over the catalyst in the reformer has heated the reforming zone to a sufficiently high temperature a valve 27 is opened in pipe 26 to allow the hydrocarbon fuel to be supplied to the hot spot and the valve 48 is closed to terminate the supply of hydrogen to the reformer 14.

Since the hydrocarbon fuelled fuel cell power system 10 is required to operate for prolonged time periods at very low loads, efficient operation of the reformer 14 at these loads is not feasible. In order to overcome this problem the reformer 14 is shut down during low load conditions. The fuel cell stack 12 is then supplied with hydrogen from the hydrogen store 16. During this period of operation the fuel cell stack is "dead ended", that is the there is no off gas bleed from the anode chambers 20. Periodically the hydrogen store 16 is recharged with hydrogen by starting up the reformer 14 for a short period of time. During such periods the reformer 14 operates at a load level sufficiently high for efficient operation. While the reformer 14 is operating there is an off gas bleed from the anode chambers 20 to prevent excessive build up of carbon monoxide and nitrogen. While the reformer 14 is operating the hydrogen store 16 is replenished with hydrogen by pumping hydrogen from the pipe 28 to the hydrogen store 16 through the proton exchange membrane 30. This is achieved by increasing the voltage applied across the proton exchange membrane 30.

During a load demand on the fuel cell stack 12 hydrogen is supplied from the hydrogen store 16 to the anode chambers 20 of the fuel cell stack 12 in two ways. In the first way the voltage across the proton exchange membrane 30 is lowered, or reversed, by adjusting the voltage of the electrical source 36. This allows hydrogen in the hydrogen store 16 to be pumped across the proton exchange membrane 30 to the pipe 28 and hence to flow to the anode chambers 20. In the second way the valve 44 in the pipe 42 is opened to allow the hydrogen at high pressure in the hydrogen store 16 to flow through the pipe 42 to the anode chambers 20.

The controller 50 continuously analyses the electrical signals from the pressure and voltage/current sensors 52 and 54 to determine if there is high load demand on the fuel cell stack 12. If the controller 50 determines that there is a high load demand on the fuel cell stack 12, the controller 50 sends operating signals either to the electrical source 36 to change the voltage supplied to the electrodes 32,34 of the proton exchange membrane 30 to cause hydrogen to flow into the pipe 28, or sends operating signals to the valve 44, to open the valve 44. Additionally the controller 50 may send an operating signal to the electrical source 40 for the electrical heater 38 to produce heating of the metal hydride to desorb hydrogen. Additionally, if the reformer 14 is shut down, the controller 50 sends operating signals to the valve 48 to open the valve 48 to allow hydrogen to be supplied to the reformer 14 to light up the reformer 14, when a large load is demanded from the stack 12.

The present invention is suitable for use with fuel cell stacks which use hydrogen as a fuel, and is particularly suitable for use with solid polymer fuel cells, phosphoric acid fuel cells, solid oxide fuel cells or any other hydrocarbon fuelled fuel cell.

The present invention provides means for buffering the fast response of the fuel cell stack and the relatively slow response of the reformer during large rapid load demands on the fuel cell stack. The present invention also provides means for starting up a reformer with fast cold start up characteristics such as the Hot Spot Reformer (Registered Trade Mark) in a hydrocarbon fuelled fuel cell power system. The present invention also enables the reformer to operate in an on/off mode during prolonged operation of a hydrocarbon fuelled fuel cell power system at zero, or very low, power to minimise, or eliminate standby fuel consumption and also gives the capability to meet large load demands on the fuel cell stack virtually instantaneously.

I claim:

1. A hydrocarbon fuelled fuel cell power system comprising a fuel cell stack having a plurality of anode chambers and a plurality of cathode chambers, a supply of hydrocarbon fuel, a reformer arranged to produce hydrogen from a hydrocarbon fuel, pipe means to supply hydrocarbon fuel from the supply of hydrocarbon fuel to the reformer, pipe means to supply hydrogen from the reformer to the anode chambers of the fuel cell stack, a hydrogen store arranged to store hydrogen produced by the reformer, pipe means to supply hydrogen from the reformer to the hydrogen store, pipe means to supply hydrogen stored in the hydrogen store to the anode chambers of the fuel cell stack, means for periodically starting the reformer, and valve means in the pipe between the supply of hydrocarbon fuel and the reformer for periodically allowing the supply of hydrocarbon fuel to the reformer for a period of time to produce sufficient hydrogen to recharge the hydrogen store with hydrogen or to directly supply the fuel cell stack during an increased load demand on the fuel cell stack and for terminating the supply of hydrocarbon fuel after the period of time, said reformer and said hydrogen store having a common supply pipe to supply hydrogen to the anode chambers of the fuel cell stack, and in which a hydrogen pump is provided to supply hydrogen between the common supply pipe and the hydrogen store, said means for periodically starting the reformer comprising a burner for burning hydrogen to raise the temperature in said reformer to a temperature sufficient for reforming the hydrocarbon fuel, pipe means to supply hydrogen stored in the hydrogen store to said burner, valve means in said pipe means for periodically allowing the supply of stored hydrogen from the hydrogen store to said burner.

2. A hydrocarbon fuelled fuel cell power system as claimed in claim 1 in which the hydrogen store comprises a metal hydride.

3. A hydrocarbon fuelled fuel cell power system as claimed in claim 2 in which the metal hydride is selected from the group consisting of an iron -titanium alloy, and a misch-metal-nickel-iron-titanium alloy.

4. A hydrocarbon fuelled fuel cell power system as claimed in claim 1 in which the hydrogen store is a pressure vessel for storing compressed hydrogen.

5. A hydrocarbon fuelled fuel cell power system as claimed in claim 1 in which a hydrogen pump interfaces between the hydrogen store and the reformer to supply hydrogen into the hydrogen store.

6. A hydrocarbon fuelled fuel cell power system as claimed in claim 5 in which the hydrogen pump comprises an electrochemical pump.

7. A hydrocarbon fuelled fuel cell power system as claimed in claim 6 in which the hydrogen pump comprises a proton exchange membrane interface between the hydrogen store and the hydrogen produced by the reformer, the proton exchange membrane has surfaces facing in opposite directions, the proton exchange membrane has electrodes mounted on said oppositely facing surfaces, the electrodes are connected to an electrical source, and the electrical potential of the electrical source controls the flow of hydrogen through the proton exchange membrane.

8. A hydrocarbon fuelled fuel cell power system as claimed in claim 2 in which the metal hydride hydrogen store has a heater to desorb hydrogen.

9. A hydrocarbon fuelled fuel cell power system as claimed in claim 8 in which the heater is an electrical heater connected to an electrical source.

10. A hydrocarbon fuelled fuel cell power system as claimed in claim 1 in which the hydrogen store is arranged to supply hydrogen to the reformer by a supply pipe such that the hydrogen is burnt to produce energy to preheat the reformer to a temperature sufficient for reforming the hydrocarbon to hydrogen, the third supply pipe has a third control valve to control the supply of hydrogen to the reformer.

11. A hydrocarbon fuelled fuel cell power system as claimed in claim 10 wherein a control means is arranged to control the operation of the first valve, the second valve, the third valve the hydrogen pump and the heater.

12. A hydrocarbon fuelled fuel cell power system as claimed in claim 11 in which voltage sensor means are provided to measure the voltage produced across the fuel cell stack, the voltage sensor means supplying a voltage signal to the control means, the control means analysing the voltage across the fuel cell stack and controlling the operation of the first valve, the second valve, the third valve the hydrogen pump and/or the heater.

13. A hydrocarbon fuelled fuel cell power system as claimed in claim 11 in which current sensor means are provided to measure the current produced by the fuel cell stack, the current sensor means supplying a current signal to the control means, the control means analysing the current produced by the fuel cell stack and controlling the operation of the first valve, the second valve, the third valve the hydrogen pump and/or the heater.

14. A hydrocarbon fuelled fuel cell power system as claimed in claim 11 in which pressure sensor means are provided to measure the partial pressure of hydrogen in the reformate supplied to the anode chambers of the fuel cell stack, the pressure sensor means supplying a partial pressure signal to the control means, the control means analysing the partial pressure of hydrogen in the reformate supplied to the fuel cell stack and controlling the operation of the first valve, the second valve, the third valve the hydrogen pump and/or the heater.

15. A hydrocarbon fuelled fuel cell power system as claimed in claim 1 in which the fuel cell stack comprises a plurality of solid polymer fuel cells.

16. A hydrocarbon fuelled fuel cell power system as claimed in claim 1 in which the reformer is a steam reformer, a partial oxidation reformer or an autothermal reformer.

17. A hydrogen fuelled fuel cell power system as claimed in claim 5 wherein a control means is arranged to control the operation of at least the hydrogen pump, the first valve means and the means for periodically starting the reformer.

18. A hydrogen fuelled fuel cell power system as claimed in claim 1 in which the reformer and the hydrogen store are arranged to supply hydrogen to the anode chambers of the fuel cell stack by a common supply pipe, the hydrogen store is arranged to supply hydrogen to the anode chambers of the fuel cell stack by a second supply pipe, the second supply pipe has a second control valve to control the flow of hydrogen from the hydrogen store to the fuel cell stack and a control means is arranged to control the operation of the first valve, the second valve the hydrogen pump and the means for periodically starting the reformer.

19. A hydrocarbon fuelled fuel cell power system as claimed in claim 1 in which the means for periodically starting the reformer comprises a pipe to supply hydrogen from the hydrogen store to the reformer such that the hydrogen is burnt to produce energy to heat the reformer to a temperature sufficient for reforming the hydrocarbon to hydrogen, the pipe has valve means to control the supply of hydrogen to the reformer.

20. A hydrocarbon fuelled fuel cell power system comprising a fuel cell stack having a plurality of anode chambers and a plurality of cathode chambers, a supply of hydrocarbon fuel, a reformer arranged to produce hydrogen from a hydrocarbon fuel, pipe means to supply hydrocarbon fuel from the supply of hydrocarbon fuel to the reformer, pipe means to supply hydrogen from the reformer to the anode chambers of the fuel cell stack, a hydrogen store arranged to store hydrogen produced by the reformer, pipe means to supply hydrogen from the reformer to the hydrogen store, pipe means to supply hydrogen stored in the hydrogen store to the anode chambers of the fuel cell stack, means for periodically starting the reformer and valve means in the pipe between the supply of hydrocarbon fuel and the reformer for periodically allowing the supply of hydrocarbon fuel to the reformer for a period of time to produce sufficient hydrogen to recharge the hydrogen store with hydrogen or to directly supply the fuel cell stack during an increased load demand on the fuel cell stack and for terminating the supply of hydrocarbon fuel after the period of time.

21. A hydrocarbon fuelled fuel cell power system comprising a fuel cell stack having a plurality of anode chambers and a plurality of cathode chambers, a supply of hydrocarbon fuel, a reformer arranged to produce hydrogen from a hydrocarbon fuel, pipe means to supply hydrocarbon fuel from the supply of hydrocarbon fuel to the reformer, pipe means to supply hydrogen from the reformer to the anode chambers of the fuel cell stack, a hydrogen store arranged to store hydrogen produced by the reformer, pipe means to supply hydrogen from the reformer to the hydrogen store, pipe means to supply hydrogen stored in the hydrogen store to the anode chambers of the fuel cell stack, means for periodically starting the reformer, and valve means in the pipe between the supply of hydrocarbon fuel and the reformer for periodically allowing the supply of hydrocarbon fuel to the reformer for a period of time to produce sufficient hydrogen to recharge the hydrogen store with hydrogen or to directly supply the fuel cell stack during an increased load demand on the fuel cell stack and for terminating the supply of hydrocarbon fuel after the period of time, said reformer and said hydrogen store having a common supply pipe to supply hydrogen to the anode chambers of the fuel cell stack, and in which a hydrogen pump is provided to supply hydrogen between the common supply pipe and the hydrogen store, said means for periodically starting the reformer comprising a burner for burning hydrogen to raise the temperature in said reformer to a temperature sufficient for reforming the hydrocarbon fuel, pipe means to supply hydrogen stored in the hydrogen store to said burner, valve means in said pipe means for periodically allowing the supply of stored hydrogen from the hydrogen store to said burner, said hydrogen pump comprising a proton exchange membrane interface between the hydrogen store and the hydrogen produced by said reformer, the proton exchange membrane having surfaces facing in opposite directions, the proton exchange membrane having electrodes mounted on said oppositely facing surfaces, said electrodes being connected to an electrical source with the electrical potential of the electrical source controlling the flow of hydrogen through said proton exchange membrane.

22. A hydrocarbon fuelled fuel cell power system comprising a fuel cell stack having a plurality of anode chambers and a plurality of cathode chambers, a supply of hydrocarbon fuel, a reformer arranged to produce hydrogen from a hydrocarbon fuel, pipe means to supply the hydrocarbon fuel to the reformer, pipe means to supply hydrogen from the reformer to the anode chambers of the fuel cell stack, at least one hydrogen store for storing hydrogen, pipe means to supply hydrogen from the reformer to the at least one hydrogen store and pipe means for supplying hydrogen stored in the at least one hydrogen store to the anode chambers of the fuel cell stack to buffer the fast response of the fuel cell stack and the relatively slower response of the reformer during relatively large rapid load demands on the fuel cell stack, another pipe means to supply hydrogen stored in the at least one hydrogen store to the reformer, valve means for periodically allowing the supply of stored hydrogen from the at least one hydrogen store to the reformer, the reformer having means for burning the hydrogen in the reformer to raise the temperature in the reformer to a temperature sufficient for reforming the hydrocarbon fuel, and valve means for periodically supplying hydrocarbon fuel to the reformer for a period of time to produce sufficient hydrogen to recharge the hydrogen store with hydrogen.

\* \* \* \* \*

UNITED STATES PATENT AND TRADEMARK OFFICE
CERTIFICATE OF CORRECTION

PATENT NO.    : 5,527,632
DATED         : June 18, 1996
INVENTOR(S)   : GARDNER

It is certified that error appears in the above-identified patent and that said Letters Patent is hereby corrected as shown below:

On the title page:

RELATED U.S. APPLICATION DATA: Item [63]:

After "abandoned" add --, which is a continuation of Application Serial No. 08/083,690 filed June 30, 1993, now abandoned--.

Signed and Sealed this

Eighth Day of October, 1996

Attest:

BRUCE LEHMAN

Attesting Officer

Commissioner of Patents and Trademarks